(12) United States Patent
Wu

(10) Patent No.: US 12,159,212 B1
(45) Date of Patent: Dec. 3, 2024

(54) SHARED DEPTHWISE CONVOLUTION

(71) Applicant: XILINX, INC., San Jose, CA (US)

(72) Inventor: Ephrem Wu, San Mateo, CA (US)

(73) Assignee: XILINX, INC., San Jose, CA (US)

( * ) Notice: Subject to any disclaimer, the term of this patent is extended or adjusted under 35 U.S.C. 154(b) by 874 days.

(21) Appl. No.: 17/182,094

(22) Filed: Feb. 22, 2021

(51) Int. Cl.
*G06F 17/16* (2006.01)
*G06N 3/04* (2023.01)
*G06V 10/44* (2022.01)
*G06V 10/82* (2022.01)

(52) U.S. Cl.
CPC ............... *G06N 3/04* (2013.01); *G06F 17/16* (2013.01); *G06V 10/454* (2022.01); *G06V 10/82* (2022.01)

(58) Field of Classification Search
CPC .......... G06N 3/04; G06F 17/16; G06V 10/82; G06V 10/454
See application file for complete search history.

(56) References Cited

U.S. PATENT DOCUMENTS

| | | | | |
|---|---|---|---|---|
| 2020/0301994 | A1* | 9/2020 | Dikici | G06N 3/063 |
| 2021/0265016 | A1* | 8/2021 | Vessere | G06N 3/063 |
| 2021/0312177 | A1* | 10/2021 | Bansal | G06F 18/24323 |
| 2021/0365716 | A1* | 11/2021 | Li | G06V 10/764 |
| 2023/0126178 | A1* | 4/2023 | Fu | G06V 10/82 382/103 |

OTHER PUBLICATIONS

He, K., et al., "Deep Residual Learning for Image Recognition," 2016 IEEE Conference on Computer Vision and Pattern Recognition (CVPR), Las Vegas, NV, USA, 2016, pp. 770-778.
Kim, Y. et al. "Compression of Deep Convolutional Neural Networks for Fast and Low Power Mobile Applications," CoRR abs/1511.06530, Feb. 24, 2016, 16 pages.
Liu, T., Depth-wise Separable Convolutions: Performance Investigations, https://tlkh.dev/depsep-convs-perf-investigations/, published Jan. 24, 2020, 12 pages.

* cited by examiner

*Primary Examiner* — Beau D Spratt
(74) *Attorney, Agent, or Firm* — Patterson + Sheridan, LLP

(57) ABSTRACT

A digital processing engine is configured to receive input data from a memory. The input data comprises first input channels. The digital processing engine is further configured to convolve, with a convolution model, the input data. The convolution model comprises a first filter layer configured to generate first intermediate data having first output channels. A number of the first output channels is less than a number of the first input channels. The convolution model further comprises a second filter layer comprising shared spatial filters and is configured to generate second intermediate data by convolving each of the first output channels with a respective one of the shared spatial filters. Each of the shared spatial filters comprises first weights. The digital processing engine is further configured to generate output data from the second intermediate data and store the output data in the memory.

21 Claims, 6 Drawing Sheets

| DESCRIPTION | SPATIAL FILTER SHAPE | NO. OF INPUT CHANNELS | NO. OF OUTPUT CHANNELS | NO. OF WEIGHTS |
|---|---|---|---|---|
| LAYER 201 | 1 x 1 | 1024 | 512 | $2^{19}$ |
| LAYER 202 | 3 x 3 | 512 | 512 | $9 \times 2^{18}$ |
| LAYER 203 | 1 x 1 | 512 | 2048 | $2^{20}$ |
| | | | TOTAL NUMBER OF WEIGHTS | 3,932,160 |

FIG. 2A

| DESCRIPTION | SPATIAL FILTER SHAPE | NO. OF INPUT CHANNELS | NO. OF OUTPUT CHANNELS | NO. OF WEIGHTS |
|---|---|---|---|---|
| LAYER 211 | 1 x 1 | $C_{in} = 1024$ | $R_{in} = 32$ | $2^{15}$ |
| LAYER 212 | 3 x 3 | $R_{in} = 64$ | $R_{in} R_f = 9 \times 64 = 576$ | $9 \times 8 = 72$ |
| LAYER 213 | 1 x 1 | $R_{in} R_f = 576$ | $R_{out} = 256$ | $9 \times 2^{14}$ |
| LAYER 214 | 1 x 1 | $R_{out} = 256$ | $C_{out} = 2048$ | $2^{19}$ |
| | | | TOTAL NUMBER OF WEIGHTS | 704,584 |

FIG. 2B

| LAYER | DESCRIPTION | SPATIAL FILTER SHAPE | NO. OF INPUT CHANNELS | NO. OF OUTPUT CHANNELS | NO. OF WEIGHTS |
|---|---|---|---|---|---|
| 221 | POINTWISE FILTER | $1 \times 1 \times \ldots \times 1$ | $C_{in}$ | $R_{in} < C_{in}$ | $C_{in} R_{in}$ |
| 222 | SHARED DEPTHWISE FILTERS | $F_1 \times F_2 \times \ldots \times F_N$ | 1 | $R_f$ | $R_f \prod_{i=1}^{N} F_i$ |
| 223 | POINTWISE FILTER | $1 \times 1 \times \ldots \times 1$ | $R_{in} R_f$ | $R_{out}$ | $R_{in} R_f R_{out}$ |
| 224 | POINTWISE FILTER | $1 \times 1 \times \ldots \times 1$ | $R_{out}$ | $C_{out}$ | $R_{out} C_{out}$ |

FIG. 2C

SHARED DEPTHWISE CONVOLUTION

TECHNICAL FIELD

Examples of the present disclosure generally relate to computing systems and electronic circuits and, in particular, to neural networks employing reduced weight tensors.

BACKGROUND

Machine learning is the science of inducing computing systems to act without being explicitly programmed. One example of machine learning is deep learning. Deep learning is a class of machine learning algorithms that uses multiple layers of nonlinear processing units for feature extraction and transformation. Deep learning algorithms can be trained using a supervised learning algorithm or an unsupervised learning algorithm. Further, deep learning algorithms can be implemented using layers of an artificial neural network (ANN) (referred to herein as a "neural network").

In general, a neural network is a collection of nodes (i.e., the "neurons") that are connected in a graph. A node in a neural network computes a sum of weighted inputs and adds an optional bias to the sum. The output of the node is a function of the final sum (referred to as an "activation function"). Example activation functions include the sigmoid function, the hyperbolic tangent (tan h) function, the Rectified Linear Unit (ReLU) function, and the identity function, among others. Neural network models are often organized into layers of nodes, which define a specific topology, and corresponding weights and biases. The weights and biases may be referred to as network parameters.

In general, a neural network includes an input layer and an output layer and can optionally include one or more hidden layers between the input and output layers. A neural network used in deep learning applications typically includes many hidden layers, which gives rise to the term deep neural network (DNN). The layers of a neural network can be densely connected (e.g., each node in a layer is fully connected to all nodes in a previous layer) or sparsely connected (e.g., each node in a layer is connected to only a portion of the nodes in a previous layer).

A convolutional neural network (CNN) is a type of DNN that includes one or more sparsely connected layers, referred to as convolutional layers. A CNN is well-suited for processing image or video data. Other types of DNNs include recurrent neural network (RNNs), which are well-suited for processing speech and text data.

Convolution operations can be performed using a number of techniques which are typically limited by the ability to use a large number of digital signal processors (DSPs), the requirement of on-chip buffers, and/or the data access patterns. Further, different convolution layers apply different weights when performing the convolution operation to generate a number of output channels from input channels of the input data. Channel pruning is applied to all convolution layers to reduce the number of channels and to compress the CNN. Reducing weight tensors along input channel dimensions may be utilized to compress the CNN. However, channel pruning and/or weight tensor reduction provide reduced accuracy and/or low compression ratios.

SUMMARY

Neural networks employing reduced weight tensor sizes without comprising inference accuracy are described in the following. Weight tensors in N-dimensional convolution have N+2 dimensions. For example, the weight tensors in N-dimensional convolution include N dimensions for spatial-filter features, one dimension for input channels, and another dimension for output channels. Employing a shared convolution block that shares spatial filters with a reduced number of weights (e.g., parameters), reduces processing overhead as compared to convolution methods that do not employ a shared convolution block.

In one example, a digital processing engine is configured to receive input data from a memory. The input data comprises first input channels. The digital processing engine is further configured to convolve, with a convolution model, the input data. The convolution model comprises a first filter layer configured to generate first intermediate data having first output channels. A number of the first output channels is less than a number of the first input channels. The convolution model further comprises a second filter layer comprising shared spatial filters and is configured to generate second intermediate data by convolving each of the first output channels with a respective one of the shared spatial filters. Each of the shared spatial filters comprises first weights. The digital processing engine is further configured to generate output data from the second intermediate data and store the output data in the memory.

In one example, an integrated circuit comprises a memory configured to store input data having first input channels and a digital processing engine coupled to the memory. The digital processing engine is configured to convolve, with a convolution model, the input data. The convolution model comprises a first filter layer configured to generate first intermediate data having first output channels. A number of the first output channels is less than a number of the first input channels. The convolution model further comprises a second filter layer comprising shared spatial filters and is configured to generate second intermediate data by convolving each of the first output channels with a respective one of the shared spatial filters. Each of the shared spatial filters comprises first weights. The digital processing engine is further configured to generate output data from the second intermediate data and store the output data in the memory.

In one example, a method for convolving input data comprises receiving the input data having first input channels from a memory. The method further comprises applying a first filter layer of a convolution model to the input data to generate first intermediate data having first output channels. A number of the first output channels is less than a number of the first input channels. Further, the method comprises applying a second filter layer of the convolution model to generate second intermediate data. The second filter layer comprises shared spatial filters and applying the second filter layer comprises convolving each of the first output channels with a respective one of the shared spatial filters. Each of the shared spatial filters comprises first weights. The method further comprises generating output data for the second intermediate data and storing the output data in the memory.

These and other aspects may be understood with reference to the following detailed description.

BRIEF DESCRIPTION OF THE DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

FIGS. 2A, 2B, and 2C illustrate example convolution blocks according to some examples.

To facilitate understanding, identical reference numerals have been used, where possible, to designate identical elements that are common to the figures. It is contemplated that elements of one example may be beneficially incorporated in other examples.

DETAILED DESCRIPTION

Figure 1:
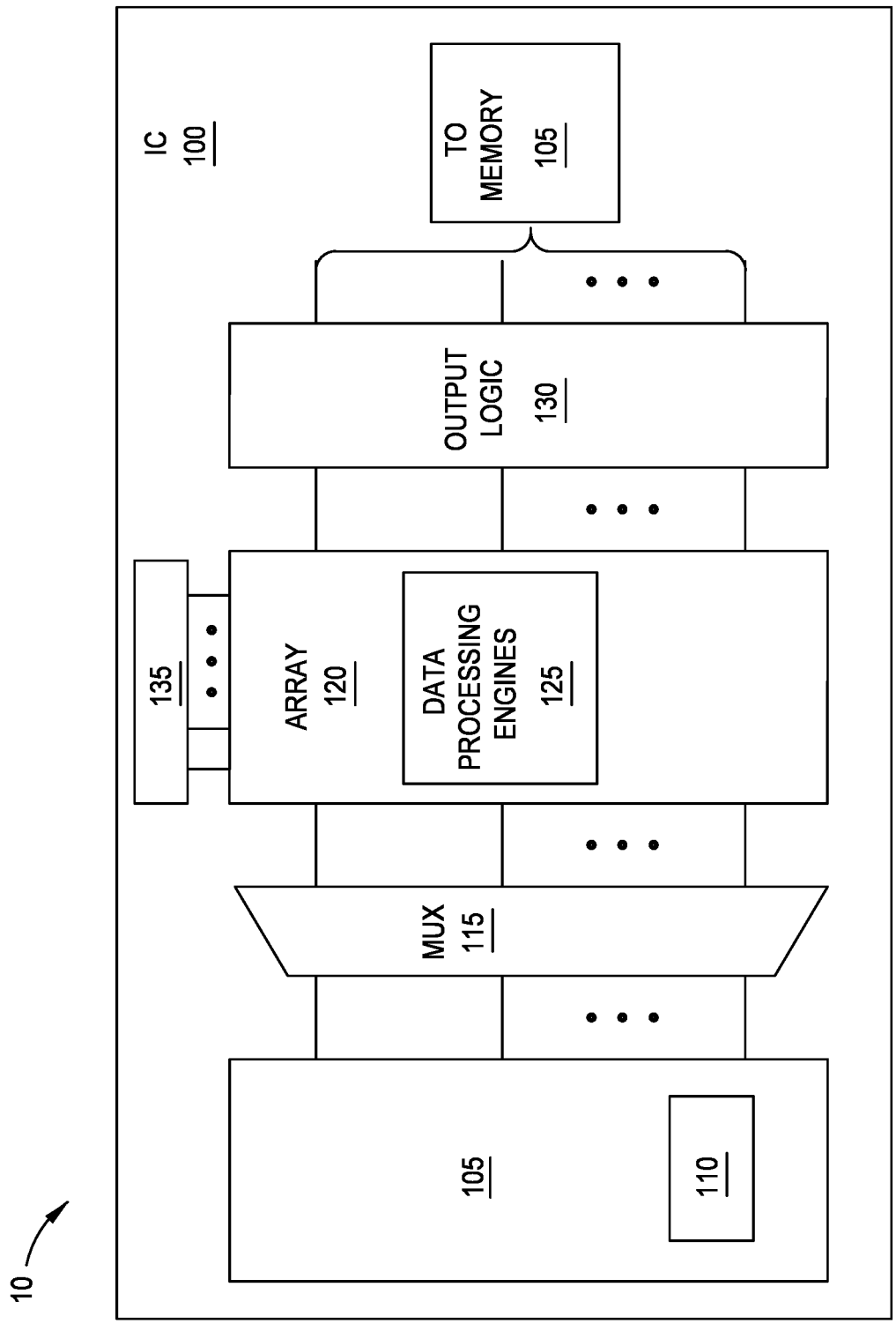
FIG. 1 is an example schematic block diagram of an integrated circuit (IC) according to some examples.

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the claimed invention or as a limitation on the scope of the claimed invention. In addition, an illustrated example need not have all the aspects or advantages shown. An aspect or an advantage described in conjunction with a particular example is not necessarily limited to that example and can be practiced in any other examples even if not so illustrated or if not so explicitly described.

Techniques for image preprocessing are described. An image preprocessor includes an architecture of multiplexers, buffers, and/or shift registers that can generate a large number of data samples every clock cycle to perform image processing operations, such as convolution. For example, convolutional neural networks (CNNs) may be utilized by the neural network processing system 10 of FIG. 1 process and categorize image data, video data, and/or other data types.

FIG. 2A illustrates three layers (e.g., filter layers) of a convolution block that may be utilized by the neural network processing system 10. The total number of weights (parameters) for three layers 201, 202, and 203 of the convolution block is the product of the number of input channels, the number of output channels, and the number of spatial filter weights for every input-output channel pair. The layers 201, 202, and 203 form a block of a residual neural network (ResNet). For example, the ResNet is a ResNet-50. As is shown in FIG. 2A, the layer 201 is a 1×1 spatial filter having $2^{19}$ weights. The layer 202 is a 3×3 spatial filter having $9 \times 2^{18}$ weights. The layer 203 is a 1×1 spatial filter having $2^{20}$ weights. The total number of weights for the convolution block including the layers 201, 202, and 203 is 3,932,160. Reducing the number of weights within the convolution block reduces the amount of storage space, processing time, and/or processing capabilities utilized by the neural network processing system 10 when performing the corresponding convolution process. For example, as will be described in more detail in the following, employing a shared convolution layer that utilizes one or more shared spatial filters reduces the number of weights, and, correspondingly, the amount storage space, processing time, and/or processing capabilities are reduced.

FIG. 2B illustrates an example convolution block including layers 211-214, and the corresponding weights for each layer. One or more of the layers is a shared spatial filter that utilizes a reduced number of weights as compared to other spatial filters. For example, the layer 212 is a shared spatial filter with a reduced number of weights as compared to other spatial filters (e.g., the spatial filters of layers 201-203). Using such a spatial filter reduces the total number of weights for the entire convolution block. For example, the layer 211 is a 1×1 spatial filter with $2^{15}$ weights. The layer 212 is a 1×1 spatial filter having 72 weights. The layer 213 is a 1×1 spatial filter having $9 \times 2^{14}$ weights. The layer 214 is a 1×1 spatial filter having $2^{19}$ weights. The total number of weights for the convolution block including layers 211, 212, 213, and 214 is 704,584. As compared to the convolution block of FIG. 2A, the convolution block of FIG. 2B has fewer weights. Accordingly, when implementing the convolution block of FIG. 2B, the neural network processing system 10 utilizes less storage space, processing time, and/or processing capabilities as compared to the convolution block of FIG. 2A.

The layer 212 is a shared spatial filter that utilizes a reduced number of weights. For example, a non-shared 3×3 spatial filter employs 9 filter weights, and the 3×3 shared spatial filter of layer 212 utilizes 5 to 8 weights. In other embodiments, less than 5 weights may be utilized. Reducing the number of weights to be less than 9, and applying the corresponding shared spatial filter to each of the input channels reduces the number of weights for that filter layer 212 as compared to other filter layers. For example, as compared to the $9 \times 2^{18}$ weights of layer 202, the layer 212 has 72 weights. Accordingly, a convolution block employing a filter layer including a shared spatial filter utilizes less storage, less processing time, and/or less process capabilities as compared to convolution block not employing a filter layer including a shared spatial filter.

FIG. 1 is a block diagram of an IC 100 that includes a customized neural network processing system 10 for performing a machine learning task, according to an example. For example, the neural network processing system 10 may be utilized to process and categorize image data, video data, and/or other data types. The neural network processing system 10 in FIG. 1 includes memory 105 which includes tensor buffers 110, a mux 115, an array 120 of digital processing engines (DPEs) 125, filter parameters (weights) 135, and output logic 130. The memory 105 stores one or more tensor buffers 110 that can be used to store all, or a portion of, input data (e.g., an image or volume) to be processed by the array 120. Each tensor buffer 110 may correspond to a particular set of pixels in an input image being processed by the neural network processing system 10. In one example, the filter parameters (e.g., weights) 135 are stored within the memory 105. Although the embodiments herein describe processing images using a neural network (e.g., a CNN), the embodiments can be used to design a neural network processing system 10 for processing other types of data such as text, audio, and the like.

The memory 105 includes separate blocks of memory (e.g., SRAM, DRAM and/or High-Bandwidth (HBM) DRAM blocks). The memory 105 sends data stored in one or more of the tensor buffers 110 in parallel to the mux 115.

The array 120 includes a plurality of DPEs 125 arranged in a grid, cluster, or checkerboard pattern in the IC 100. The DPEs 125 are arranged in a 2D array of rows and columns.

In other embodiments, the DPEs 125 are arranged to other arrangements. Further, the array 120 can be any size and have any number of rows and columns formed by the DPEs 125. One or more of the DPEs 125 may be assigned to neural network processing. For example, only some of the DPEs 125 may be assigned to the neural network processing system 10. In such embodiments, the IC 100 may include other DPEs in the array 120 that are physically present in the IC 100 but are used to perform one or more different functions. For example, the array 120 may include a 10×10 array of DPEs 125, but only five rows of the DPEs 125 (each containing 10 DPEs) are used in the neural network processing system while the other five rows are used to perform one or more different functions in the IC 100.

In general, the mux 115 connects the tensor buffers 110 to the array 120. More specifically, the mux 115 connects individual ones of the tensor buffers 110 in the memory 105 to all the rows of the array 120 or only a sub-portion of the rows in the array 120. The number of DPEs 125 and/or rows of the array 120 to which each tensor buffer 110 is connected is variable and can be used to customize the neural network processing system 10.

In addition to limiting the connectivity provided by the mux 115, the size (height and width) of the array 120 can also be customized. For example, the number of rows of the array 120 (i.e., height of the array 120) correspond to the number of tensor buffers 110 used to divide the input data (e.g., images). The columns of the array 120 (i.e., width of the array 120) corresponds to the number of filter parameters 135 used when the DPEs 125 process the data stored in the tensor buffers 110. In one embodiment, the array 120 performs a convolution operation with an input image/volume/IFMs and filter parameters 135. One or more of the DPEs 125 of the array 120 receives filter parameters 135 to perform the convolution.

In one embodiment, the DPEs 125 are identical. That is, each of the DPEs 125 (also referred to as tiles or blocks) may have the same hardware components or circuitry. In one or more embodiments, one or more of the DPEs 125 differs from another one or more of the DPEs 125. For example, the hardware components and/or circuitry of one or more DPEs 125 differs from that of another one or more of the DPEs 125. Further, the embodiments herein are not limited to DPEs 125. Instead, the IC 100 can include an array of any kind of processing elements, for example, the DPEs 125 could be digital signal processing engines, cryptographic engines, Forward Error Correction (FEC) engines, or other specialized hardware for performing one or more specialized tasks.

In FIG. 1, the array 120 includes DPEs 125 that are all the same type (e.g., a homogeneous array). However, in another embodiment, the array 120 includes different types of DPEs. For example, the array 120 may include digital signal processing engines, cryptographic engines, graphic processing engines, and the like.

In one embodiment, one or more of the DPEs 125 are formed from software-configurable hardened logic, i.e., the one or more of the DPEs 125 are hardened. In one embodiment, a first portion of the DPEs 125 are formed from software configurable hardened logic and a second portion of the DPEs are formed from programmable logic. One advantage of employing DPEs 125 formed from hardened logic, is that such doing DPEs 125 may take up less space in the IC 100 relative to using programmable logic to form the hardware elements in the DPEs 125. That is, using hardened logic circuitry to form the hardware elements in the DPE 125 such as program memories, an instruction fetch/decode unit, fixed-point vector units, floating-point vector units, arithmetic logic units (ALUs), multiply accumulators (MAC), and the like can significantly reduce the footprint of the array 120 in the IC 100. Although the DPEs 125 may be hardened, this does not mean the DPEs 125 are not programmable. That is, the DPEs 125 can be configured when the IC 100 is powered on or rebooted to perform different functions or tasks.

The output logic 130 receives the data processed by the DPEs 125 and stores the processed data in the memory 105. In one embodiment, the output logic 130 receives the data processed by the DPEs 125 and stores the processed data back in the same tensor buffers 110 (and the same memory blocks of the memory 105) from which the data was retrieved. The output logic 130 is coupled to the memory 105 so that the processed data can be stored back into the tensor buffers 110 once it has been processed by the DPEs 125.

The IC 100 may include programmable logic or may be formed entirely from hardened circuitry. In one embodiment, the IC 100 may be a field programmable gate array (FPGA) or system on a chip that has a mix of programmable logic (e.g., look up tables (LUTs), configurable logic blocks (CLBs), etc.) and hardened circuitry. For example, the mux 115 may be implemented using programmable logic while the DPEs 125 are formed using hardened logic, or the mux 115, the DPEs, and the output logic 130 can be formed from programmable logic. In another embodiment, all the elements in FIG. 1 may be formed from hardened circuitry. One advantage of hardening the mux 115 is that hardened circuitry typically requires less space in the IC 100 than programmable logic. However, this may mean the connectivity provided by the mux 115 cannot be changed once the IC 100 is fabricated. Instead, if the mux 115 is formed from programmable logic, the IC 100 can be reused (i.e., customized) for a different machine learning algorithm that may desire a different connectivity and an array 120 with a different height or width.

The DPEs 125 are configured to process input data (e.g., image data, video data, voice data, text data, or the like) as part of a CNN. For example, one or more of the DPEs 125 apply a convolution model to input data to pre-process the input data.

FIG. 2C illustrates an example convolution model (block) 200 that is utilized by the neural network processing system 10 to process the input data. The convolution model 200 includes filter layers 221, 222, 223, and 224. Further, the convolution model 200 employs shared convolution as the spatial filters of the filter layer 202 use a common (e.g., shared) weight (e.g., filter parameter). Shared convolution will be described in greater detail in the following.

The convolution model 200 may be implemented as part of a ResNet. A ResNet includes short connections between layers of the neural network. A ResNet includes one or more bottleneck layers. In one example, a ResNet includes a first convolution layer followed by a max pooling layer. The max pooling layer is followed by one more residual convolution layers (e.g., bottleneck layers). The one or more residual convolution layers is followed by an average pooling layer.

Figure 3:
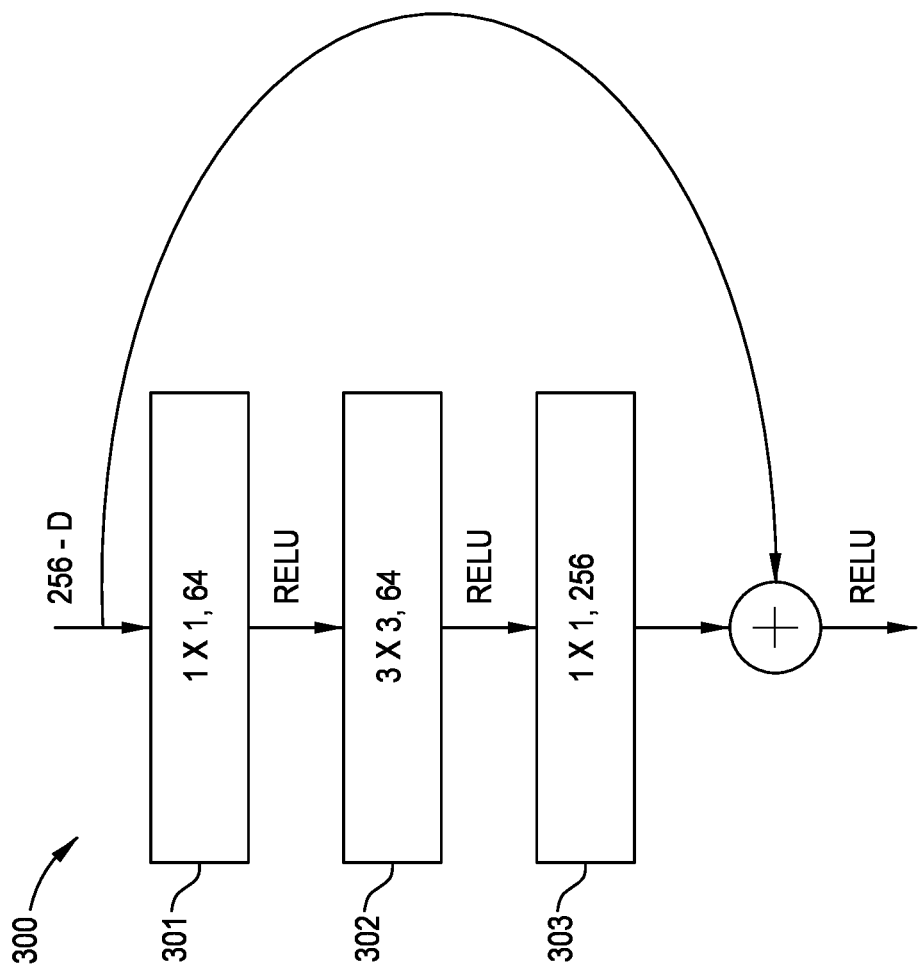
FIG. 3 illustrates an example neural network block according to some examples.

The bottleneck layers are the building blocks for the ResNet and include two or more layers. An example bottleneck layer 300 is illustrated in FIG. 3. The bottleneck layer 300 includes layers 301, 302, and 303. Further, after layer 301 and after layer 302 a rectifier function is performed by a non-linear activation function. In one example, the rectifier function is performed by a rectified linear unit (ReLU). In one example, the bottleneck layer 300 is performed multiple times. For example, the bottleneck layer 300 is stacked three times. In another embodiment, the bottleneck layer 300 is stacked less than three times or more than three times.

In other examples, the convolution model 200 may be implemented as a part of other types of deep learning neural networks. In one specific example, the convolution model 200 is implemented as part of a CNN.

As is noted above, the convolution model 200 includes four filter layers, e.g., the filter layers 221, 222, 223, and 224. In one or embodiments, the filter layer 224 is omitted and the convolution model 200 includes three layers. The convolution model 200 includes parameters $R_{in}$, $R_f$, and $R_{out}$. The parameters $R_{in}$, $R_f$, and $R_{out}$ may be referred to as first, second, and third parameters, respectively. In one embodiment, $R_{in}$, $R_f$ and $R_{out}$ may be referred to as hyperparameters. As will be described in greater detail in the following, $R_{in}$ refers to a reduced number of input channels, $R_f$ refers to a reduced number of parameters, and $R_{out}$ refers to a reduced number of output channels, as compared to non-shared convolution models. Further, the convolution model 200 includes N spatial filter dimensions ($F_1 \times F_2 \times \ldots \times F_N$, where N is a positive integer), input channels $C_{in}$, and output channels $C_{out}$. $R_f$ is selected to be less than the patch size of the corresponding spatial filter. For example, for a 3×3 spatial filter having a patch size of 9, $R_f$ is selected to be less than 9. Further, $R_{in}$ is less than $C_{in}$ and $R_{out}$ is less than $C_{out}$. The determination of $R_{in}$ and $R_{out}$ is described in the following.

The filter layer 221 includes one or more pointwise filters having a spatial shape of 1×1× ... ×1. The filter layer 221 reduces the number of input channels in the input data from $C_{in}$ to $R_{in}$ ($R_{in}$ is less than $C_{in}$) using the pointwise filters to perform channel wise weighted averaging. For example, the filter layer 221 reduces the number of input channels in the input data from 256 to 128 (or less). The total number of parameters of layer 221 is $C_{in}*R_{in}$. The filter layer 221 generates an output vector that is provided as an input vector to the filter layer 222. Further, the output vector may be referred to as intermediate data.

The filter layer 222 may be referred to as a shared depthwise convolutional layer. The filter layer 222 includes one or more parallel shared depthwise filters. The layer 222 has a spatial filter shape of $F_1 \times F_2 \times \ldots \times F_N$. N is a positive integer. For example, N is equal to or greater than 3. The filter layer 222 applies the same set of $R_f$ convolutional filters to each output channel $R_{in}$ of the filter layer 221. The number of input channels of the filter layer 222 matches the number of output channels of the filter layer 221. The number of input channels of the filter layer 222 and the number of output channels of the filter layer 221 are $R_{in}$. Each filter of the filter layer 222 reads and processes data of a corresponding output channel of the filter layer 221. Stated another way, along the input-channel axis in layer 222, each filter in layer 222 reads data from a respective channel. Further, there are $R_{in}$ instances of a one input channel to output channel in filter layer 222. The number of output channels of the filter layer 222 is $R_f$. Further, the number of parameters is $R_f \Pi_{i=1}^{N} F_i$.

As compared to other convolutional models, the filter layer 222 reduces the number of parameters as each channel shares the same weight tensor of the shape $F_1 \times \ldots \times F_n \times 1 \times R_f$. Further, as each input channel is expanded into $R_f$ channels, the filter layer 222 creates an output with $R_f R_{in}$ output channels. The output generated by the filter layer 222 may be referred to as intermediate data. The output maybe a tensor, vector, or a matrix.

The filter layer 223 includes one or more pointwise filters that converts the input (the output of the filter layer 222) with $R_f R_{in}$ channels (e.g., the tensor of the filter layer 222) into an output with $R_{out}$ channels. The layer 223 has a spatial filter shape of 1×1× ... ×1. Further, the layer 223 has $R_{in}*R_f*R_{out}$ weights. In one or more embodiments, the filter layer 223 is combined with the filter layer 222 to form a single layer. In such embodiments, the filter parameters of filter layer 222 are reused. The output generated by the filter layer 223 may be referred to as intermediate data. The output maybe a tensor, vector, or a matrix.

The filter layer 224 includes one or more pointwise filters that convert the input (e.g., the output of the filter layer 223) from the number of channels $R_{out}$ to the number of channels $C_{out}$. The layer 224 has a spatial filter shape of 1×1 ... ×1. Further the number of channels of the input is $R_{out}$ and the number of channels of the output is $C_{out}$ which is greater than $R_{out}$. The output of the filter layer 224 may be provided and stored in memory 105. The output maybe a tensor, vector, or a matrix. Further, the output of the filter layer 224 may be provided as an input to the filter layer 221 or to another convolution block of a neural network.

Figure 4:
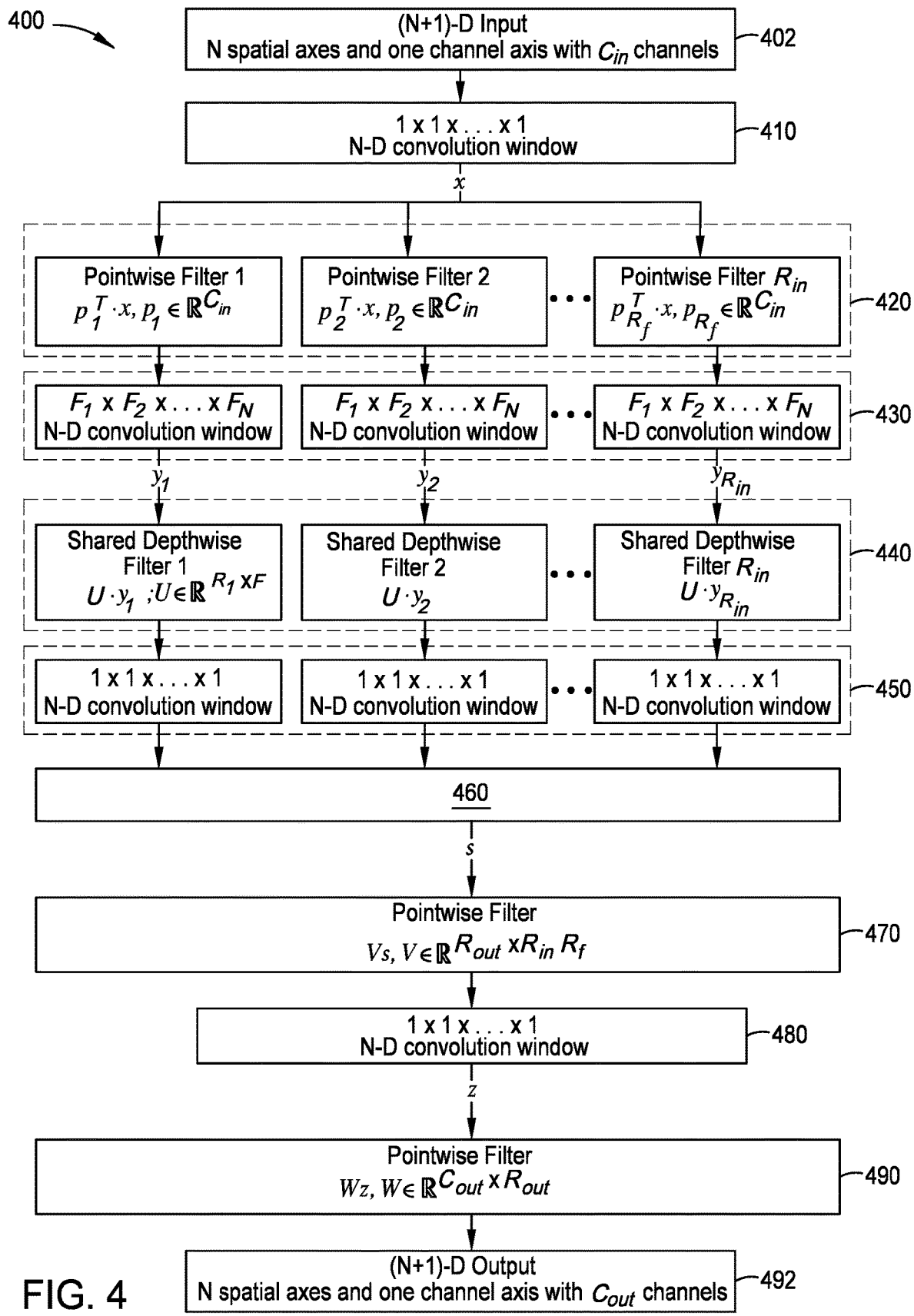
FIG. 4 illustrates an example flow diagram of a convolution model according to some examples.

FIG. 4 illustrates a compute graph 400 illustrating a shared convolution process utilizing the convolution model 200. At block 402 an input tensor (e.g., input data) having one or more spatial axes (e.g., N spatial axes where N is a positive integer) and one channel axis with $C_{in}$ channels is received.

At block 410 a 1×1× ... ×1 N-D convolution window is applied to the input tensor received at block 402. The output variable x is generated by the block 410. The output variable x is a vector. The N-D convolution window is a sliding window that extracts data from the input tensor and provides the extracted data as the output variable x. N is a positive integer of 1 or more.

At block 420 the output variable x is processed by the pointwise filters 1 to $R_{in}$. Each of the pointwise filters is represented by $p_i^T \cdot x, p_i \in \mathbb{R}^{C_{in}}$, where "i" is 1, 2, ... $R_f$. For example, a first pointwise filter (e.g., the pointwise filter 1) is applied to a first input channel of the input channels $R_{in}$ of the tensor x, and is represented by $p_1^T \cdot x, p_1 \in \mathbb{R}^{C_{in}}$, A second pointwise filter is applied a second input channel of the input channels $R_{in}$ of the variable x, and is represented by $p_2^T \cdot x, p_2 \in \mathbb{R}^{C_{in}}$. Further the pointwise filter channel $R_{in}$ is applied to the input channels $R_{in}$ of the variable x, and is represented by $p_{R_f}^T \cdot x, p_{R_f} \in \mathbb{R}^{C_{in}}$.

At block 430, the output of each pointwise filter is applied to an $F_1 \times F_2 \times \ldots \times F_N$ N-D convolution window. N is a positive integer of 1 or more. Each N-D convolution window processes the output of a corresponding pointwise filter 420 to generate a corresponding output variable y. Each output variable y is a vector. The output variable of each convolution window (e.g., $y_1, y_2, \ldots, y_{R_{in}}$) is applied to a corresponding shared depthwise filter of block 440.

Each of the shared depthwise filters may be represented by $Uy_M$, where M is 1, 2, ..., $R_{in}$. U is a matrix with $R_f$ rows and F columns. U is equal to $U \in \mathbb{R}^{R_f \times F}$ Further, U includes all of the shared depthwise weights (e.g. filter parameters). As is noted above, U is multiplied with a respective vector $y_M$ provided by a respective N-D convolution window of block 430. The product of the corresponding multiplication is output by each shared depthwise filter of block 440. As U has $R_f$ rows, the column vector from the corresponding multiplication of U and $y_M$ (e.g., the output of each corresponding shared depthwise filter) has $R_f$ rows.

In one example, a first shared depthwise filter (e.g., a shared depthwise filter 1) is represented by $Uy_1$, a second shared depthwise filter (e.g., a shared depthwise filter 2) is $Uy_2$, and a $R_{in}$ depthwise filter (e.g., a shared depthwise filter Rin) is represented by represented by $Uy_{R_{in}}$. The output vector of each shared depthwise filter of block 440 is output to a corresponding 1×1× . . . ×1 N-D convolution window of block 450. N is a positive integer of 1 or more.

The output vector of each convolution window of block 450 is provided to block 460 and concatenated into $R_{in}R_f$ output channels. The output vector s of block 460 is received by the pointwise filter of block 470. The pointwise filter of the block 470 is represented by $V_s$, $V \in \mathbb{R}^{R_{out} \times R_{in} R_f}$. The pointwise filter of the block 470 is applied to the output vector of the block 460 to generate an output vector that is applied to the 1×1× . . . ×1 N-D convolution window of block 480. N is a positive integer of 1 or more.

The 1×1× . . . ×1 N-D convolution window of the block 480 is applied to the output vector of the block 470 to generate an output vector z that is provided to block 490. The block 490 includes a pointwise filter represented by Wz, $W \in \mathbb{R}^{C_{out} \times R_{out}}$. The pointwise filter of the block 490 is applied to the output vector z to generate an output tensor illustrated in block 492. The output tensor as illustrated by block 492 has N spatial axes and one channel axis with $C_{out}$ channels. N is a positive integer of 1 or more.

As is discussed above, using shared convolution within a convolution model (e.g., convolution model 200) compresses the weight tensor as to compared to other convolution processes by a factor of:

$$\frac{FC_{out}C_{in}}{C_{in}R_{in} + FR_f + R_f R_{in} R_{out} + R_{out} C_{out}},$$

where $F = \Pi_{i=1}^{N} F_i$ is the size of the spatial filter.

In various examples, employing the shared convolution of the convolution model 200 improves throughput of the corresponding neural net by reducing corresponding computation. For example, the speed-up factor (e.g., increased throughput) is:

$$\frac{FC_{out}C_{in}}{R_{in}(C_{in} + FR_f + R_f R_{out}) + R_{out} C_{out}}.$$

In view of the above, the shared convolution method of FIG. 4 reduces the weights (e.g., parameters) as compared to non-shared convolution methods. For example, a ResNet-50 neural net (e.g., a neural net that does not employ shared convolution) utilizes various bottleneck layers as illustrated in FIG. 3 (e.g., conv_5a, conv_5b, and conv_5c). Converting the bottleneck layers to shared convolution models as illustrated in FIGS. 2 and 4, saves over 10,000,000 parameters as compared to neural nets not employing shared convolution models. For example, a ResNet-50 neural net utilizes 25,610,216 weights. Employing a shared convolution model as described with regard to FIGS. 2 and 4 utilizes 15,075,520 weights. Accordingly, the number of weights is reduced by about 41%. Further, utilizing the shared convolution model of FIGS. 2 and 4 reduces the corresponding accuracy minimally (e.g., a reduction of about 0.5%) as compared to other neural net compression methods.

Figure 5:
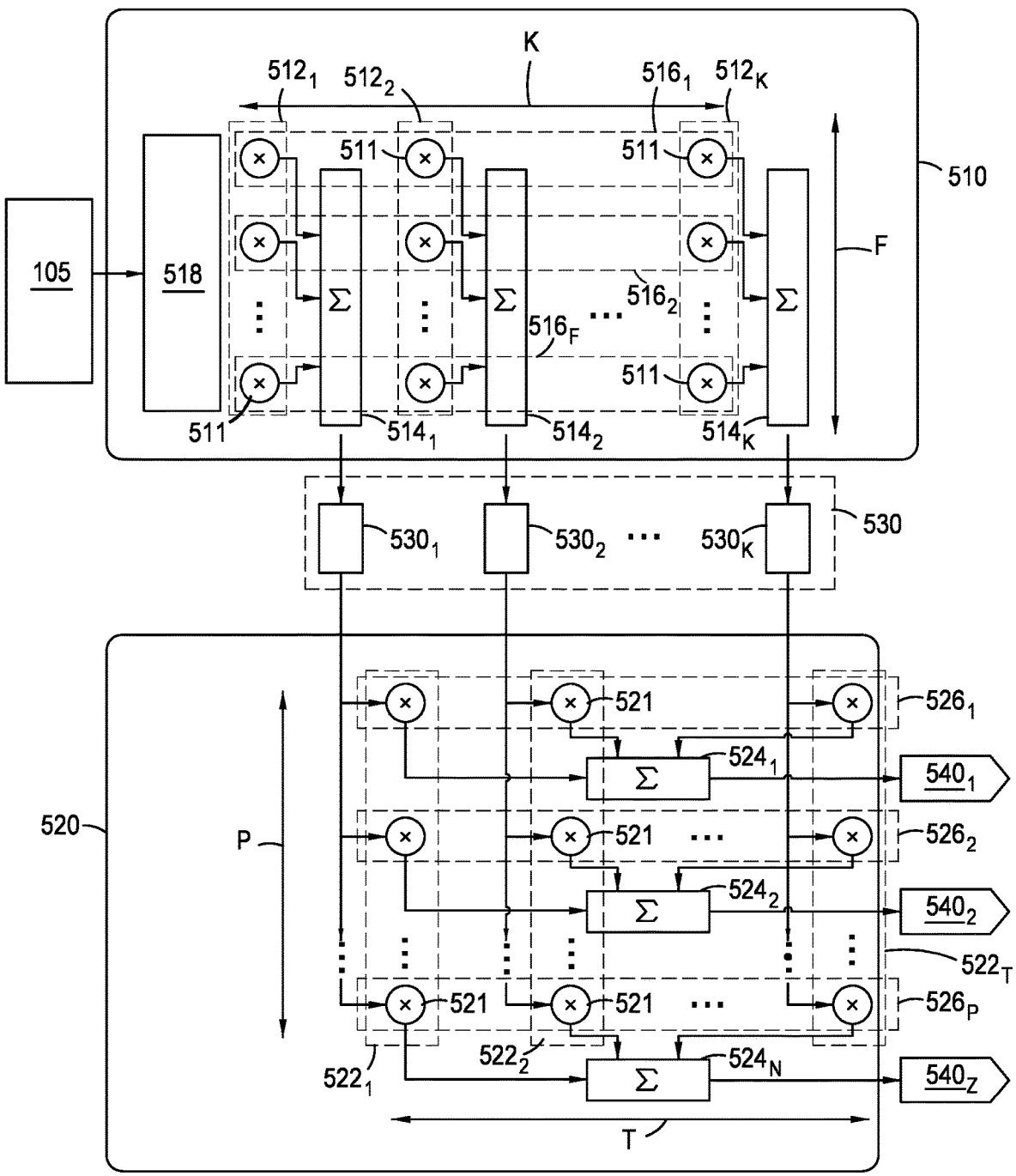
FIG. 5 is an example schematic block diagram for executing a convolution model according to some examples.

FIG. 5 illustrates an example circuit schematic of convolution circuitry 500 that may be employed as part of the neural network processing system 10, according to one or more embodiments. The convolution circuitry 500 includes depthwise multiplier 510 (e.g., a first matrix multiplier) and pointwise multiplier 520 (e.g., a second matrix multiplier). The depthwise multiplier 510 executes the filter layer 222 of FIG. 2 and the pointwise multiplier 520 executes the filter layer 223 of FIG. 2. The depthwise multiplier 510 is executed by the MUX 115 and one or more of the DPEs 125 of FIG. 1. The pointwise multiplier 520 is executed by one or more of the DPEs 125 of FIG. 1.

The depthwise multiplier 510 includes multipliers 511 and summation circuitry 514. One or more of the DPEs 125 of FIG. 1 implements the multipliers 511 and the summation circuitry 514. The multipliers 511 are arranged in rows 516 and columns 512. The output of each multiplier 511 is coupled to an input of a corresponding summation circuitry 514. For example, the output of each multiplier 511 of column $512_1$ is coupled to inputs of the summation circuitry $514_1$, the output of each multiplier 511 or column $512_2$ is coupled to inputs of the summation circuitry $514_2$, and the output of each multiplier 511 of column $512_K$ is coupled to inputs of the summation circuitry $514_K$. K is an integer greater than 2.

The depthwise multiplier 510 further includes memory and data distributor 518. The memory and data distributor 518 is coupled to the memory 105. In one example, the memory and data distributor 518 is coupled to one or more tensor buffer 110 of the memory 105. The memory and data distributor 518 receives one or more tensors from the memory 105. The depthwise multiplier 510 is executed by the MUX 115 of FIG. 1 and/or one or more the DPEs 125 of FIG. 1.

The multipliers 511 are coupled to the memory and data distributor 518. The memory and data distributor 518 outputs a corresponding tensor to each column 512 of multipliers 511. For example, the memory and data distributor 518 outputs a first tensor to the column $512_1$, a second tensor to the column $512_2$, and a K tensor to the column $512_K$. In one example, K equals the number of input channels. In another example, K is less than the number of input channels. In such an embodiment, the number of input channels is divisible by K. For example, for 256 input channels, K may be 32, 64, or 128, among others. In examples where K is less than the number of input channels, the depthwise multiplier 510 performs the functions of the corresponding filter layer multiple times until all of the tensor data is processed. For example, in an embodiment where the value of K is equal to half of the number of channels, the depthwise multiplier 510 performs the functions of the filter layer 222 of FIG. 2 two times.

Each multiplier 511 has two inputs. A first input corresponds to data (e.g., activations) and the second input corresponds to a weight (e.g., a filter parameter). Each multiplier 511 multiplies the data at the first input with the weight at the second input. A first input of each multiplier 511 of a common column 512, receives the same data from the memory and data distributor 518. The data is associated with a corresponding input tensor or vector. For example, the data may be the output data of layer 221 of FIG. 2C, or block 430 of FIG. 4. The weight of each multiplier 511 of a column 512 may be unrelated from each other. For example, the weight of each multiplier 511 of a column differs from the weight of each other multiplier 511 in that column 512. In another embodiment, a weight of one or more multipliers 511 of a column 512 is the same as the weight of another one or more multiplier 511 of the column 512. Each column 512 may include one or more multipliers 511 with a common weight and one or more multipliers 511 with different weights.

In one embodiment, with reference to FIG. 2C, the spatial filter shape of the depthwise filter of the filter layer 222, is 3×3. In such an embodiment, the depthwise filter of the filter layer 222 has 9 multipliers. For each clock cycle of the IC 100, the throughput is one 3×3 convolution. The memory and data distributor 518 provides data associated with each channel of an input tensor stored within the memory 105 to respective columns 512 such that each channel is provided to a different column 512.

The weights are provided (e.g., broadcasted or transmitted) to each multiplier 511 of a row 516. The weights of each multiplier 511 of a row 516 are unrelated to each other. The weights may be represent as scaler values. Providing the weights includes providing a weight vector with F elements horizontally. In one embodiment, the weights are provided from left to right (e.g., from column $512_1$ to column $512_K$). In other embodiments, the weights may be provided right to left, or in another direction or orientation. In one example, each of the columns 512 shares the same $R_f \times F$ weight matrix. K is a multiple of $R_f$.

In one embodiment, the weights are provided from the memory and data distributor 518. For example, the memory and data distributor 518 accesses the weights stored within the memory 105 and provides the weights to the corresponding multipliers 511. The weights may be stored as the filter parameter 135. In other embodiments, the weights may be provided by DRAM coupled to or included as part of the IC 100, an HBM DRAM of the IC 100, or SRAM of the IC 100. In one embodiment, a DRAM provides the weights directly to the multipliers 511 without first providing the weights to an SRAM of the IC 100. In such an embodiment, the DRAM provides the weights to the multipliers 511 via the memory and data distributor 518. Further, the DRAM is coupled to the memory and data distributor 518. The SRAM may also be coupled to the memory and data distributor 518, and the DRAM and SRAM are at the same level of the memory hierarchy.

Each of the summation circuitries 514 sums the outputs of the multipliers 511 of a corresponding column 512. For example, the summation circuitry $514_1$ sums the outputs of the multipliers 511 of the column $512_1$, the summation circuitry $514_2$ sums the outputs of the multipliers 511 of the column $512_2$, and the summation circuitry $514_k$ sums the outputs of the multipliers 511 of the column $511_K$.

The output of each summation circuitry 514 is provided to a corresponding one of the buffers 530. For example, the output of the summation circuitry $514_1$ is provided to the buffer $530_1$, the output of the summation circuitry $514_2$ is provided to the buffer $530_2$, and the output of the summation circuitry $514_k$ is provided to the buffer $530_K$. The buffers 530 may be individual (e.g., discrete) buffers or may be part of a combined memory. In one embodiment, the buffers 530 are provided as part of the memory 105.

The pointwise multiplier 520 includes multipliers 521 and summation circuitries 524. The pointwise multiplier 520 performs the function of the pointwise filter of filter layer 223. The input of the pointwise multiplier 520 is coupled to the output of the depthwise multiplier 510 via the buffers 530.

The multipliers 521 are arranged in columns 522 and rows 526. Each multiplier 521 of each row 526 is coupled to a corresponding summation circuitry 524. For example, the multipliers 521 of the row $526_1$ are coupled to the summation circuitry $524_1$, the multipliers 521 of the row $526_2$ are coupled to the summation circuitry $524_2$, and the multipliers 521 of the row $526_P$ are coupled to the summation circuitry $524_N$. P is an integer greater than 2.

The output of each buffer 530 is provided to a corresponding column 522 of multipliers 521. For example, the output of the buffer $530_1$ is provided to the multipliers 521 of the column $522_1$, the output of the buffer $530_2$ is provided to the multipliers 521 of the column $522_2$, and the output of the buffer $530_1$ is provided to the multipliers 521 of the column $522_T$. T is an integer greater than 2. In one example, T is equal to K. In another example, T is greater than or less K.

The multipliers 521 have two inputs. For example, a first input of the multipliers 521 receive a value from a corresponding buffer 530 and a second input of the multipliers 521 receive a corresponding weight. The first input for each multiplier 521 of a common column 522 receives the same input data at a corresponding first input from a corresponding buffer. For example, a first input of each multiplier 521 of column $522_1$ receives the same data from the buffer $530_1$.

The weights are provided by the memory 105 or a memory other than then memory 105. For example, the weights may be provided by DRAM coupled to or included within the IC 100, an HBM DRAM of the IC 100, or an SRAM of the IC 100. In one example, the DRAM provides the weights directly to the multipliers 521 without first providing the weights to an SRAM of the IC 100. In one example, the weight is hardcoded into each multiplier 521.

The output of each multiplier 521 in a common row 526 is provided to a corresponding summation circuitry 524 to generate a corresponding value stored in a tensor block 540. Each of the tensor blocks 540 is stored within the memory 105. Further, each of the tensor blocks 540 corresponds to one of the tensor buffers 110. The output of the summation circuitry $524_1$ is provided to the tensor block $540_1$, the output of the summation circuitry $524_2$ is provided to the tensor block $540_2$, and output of the summation circuitry $524_N$ is provided to the tensor block $540_Z$. Z is an integer and may be equal to M and/or K. In another example, Z is an integer and differs from at least one of M and K.

While not illustrated, the outputs of the tensor blocks 540 are provided to one or more multipliers and one or more summation circuities to execute the pointwise filter of the filter layer 224. Further, in one example, the depthwise multiplier 510 and the pointwise multiplier 520 may be executed in parallel as compared to serially.

In one example, one or more non-linear computations are performed between the depthwise multiplier 510 and the pointwise multiplier 520. For example, one or more operations selected from the group consisting of max-pooling, normalization, and activation functions (e.g., a ReLu function, a hyperbolic tangent (tan h) function, and softmax among others) are performed between the depthwise multiplier 510 and the pointwise multiplier 520.

The circuit elements of the memory and data distributor 518, multipliers 511, 521, and summation circuitries 514 and 524 are formed as part of the DPEs 125. For example, a first one or more DPEs 125 is configured as the memory and data distributor 518, the multipliers 511, and the summation circuitries 514 of the depthwise multiplier 510. A second one or more DPEs 125 is configured as the multipliers 521, and the summation circuitries 524 of the pointwise multiplier 510. Further, the buffers 530 are executed by one or more the DPEs 125. In one or more embodiments, the depthwise multiplier 510 and/or the pointwise multiplier 520 are implemented by hardened circuitry within DPEs 125 of the IC 100. In other embodiments, the depthwise multiplier 510 is implemented by programmable DPEs 125 and the pointwise multiplier 520 is implemented by hardened DPEs within the IC 100.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the users computer and partly on a remote computer or entirely on the remote computer or server. In the latter scenario, the remote computer may be connected to the users computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various examples of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to specific examples, other and further examples may be devised without departing from the basic scope thereof, and the scope thereof is determined by the claims that follow.

What is claimed is:

1. A digital processing engine configured to:
   receive an input tensor having one or more spatial axes and a channel axis with first input channels from a memory;
   generate a first vector from the input tensor by applying filters of a first filter layer of a convolution model to the input tensor, the first vector having first output channels, a number of the first output channels is less than a number of the first input channels;
   convolve each of the first output channels with a respective shared spatial filter of shared spatial filters of a second filter layer of the convolution model to generate an output tensor from the first vector by multiplying, via first multiplier circuitries of the digital processing engine, first data of a first output channel of the first output channels with first weights, and multiplying, via second multiplier circuitries of the digital processing engine, second data of a second output channel of the first output channels with the first weights; and
   generate output data from the output tensor and store the output data in the memory.

2. The digital processing engine of claim 1, wherein the convolution model further comprises:
   a third filter layer configured to generate third intermediate data from the output tensor, the third intermediate data having a number of second output channels smaller than the number of the first input channels.

3. The digital processing engine of claim 2, wherein the convolution model further comprises:
   a fourth filter layer configured to generate the output data from the third intermediate data, the output data having a number of third output channels equal to the number of the first input channels.

4. The digital processing engine of claim 1, wherein the first filter layer comprises pointwise filters.

5. The digital processing engine of claim 1 further comprising a first matrix multiplier configured to execute the second filter layer, the first matrix multiplier comprising:
   first multipliers arranged in first rows and first columns, wherein the first multipliers comprise the first multiplier circuitries and the second multiplier circuitries.

6. The digital processing engine of claim 5, wherein the first matrix multiplier further comprises:
   first summation circuitries, wherein each of the first summation circuitries sums an output from each of the first multiplier circuitries and the second multiplier circuitries of a respective column of the first columns.

7. The digital processing engine of claim 6 further comprising a second matrix multiplier comprising:
   second multipliers arranged in second rows and second columns, wherein multipliers of a common row of the second rows multiply an output of a respective one of the first summation circuitries with second weights.

8. The digital processing engine of claim 7, wherein the second matrix multiplier further comprises:
   second summation circuitries, wherein each of the second summation circuitries sums an output from each of the second multipliers of a common row of the second rows.

9. The digital processing engine of claim 5, wherein a number of the first columns is a multiple of the number the first input channels.

10. The digital processing engine of claim 1, wherein the input tensor comprises image data or video data.

11. An integrated circuit comprising:
    a memory configured to store an input tensor having one or more spatial axes and a channel axis with first input channels; and
    a digital processing engine coupled to the memory and configured to:
       generate a first vector from the input tensor by applying filters of a first filter layer of a convolution model to the input tensor, the first vector having first output channels, a number of the first output channels is less than a number of the first input channels;
       convolve each of the first output channels with a respective shared spatial filter of shared spatial filters of a second filter layer of the convolution model to generate an output tensor from the first vector by multiplying, via first multiplier circuitries of the digital processing engine, first data of a first output channel of the first output channels with first weights, and multiplying, via second multiplier circuitries of the digital processing engine, second data of a second output channel of the first output channels with the first weights; and
       generate output data from the output tensor and storing the output data in the memory.

12. The integrated circuit of claim 11, wherein the convolution model further comprises:
    a third filter layer configured to generate third intermediate data from the output tensor, the third intermediate data having a number of second output channels smaller than the number of the first input channels.

13. The integrated circuit of claim 12, wherein the convolution model further comprises:
    a fourth filter layer configured to generate the output data from the third intermediate data, the output data having a number of third output channels equal to the number of the first input channels.

14. The integrated circuit of claim 11, wherein the first filter layer comprises pointwise filters.

15. The integrated circuit of claim 11, wherein the digital processing engine further comprises a first matrix multiplier configured to execute the second filter layer of the convolution model, the first matrix multiplier comprising:
    first multipliers arranged in first rows and first columns, wherein the first multipliers comprise the first multiplier circuitries and the second multiplier circuitries; and
    first summation circuitries, wherein each of the first summation circuitries sums an output from each multiplier of a respective column of the first columns.

16. The integrated circuit of claim 15, wherein the digital processing engine further comprises a second matrix multiplier comprising:
    second multipliers arranged in second rows and second columns, wherein multipliers of a common row of the second rows multiply an output of a respective one of the first summation circuitries with second weights; and
    second summation circuitries, wherein each of the second summation circuitries sums an output from each of the second multipliers of a common row of the second rows.

17. A method for convolving an input tensor, the method comprises:
    receiving the input tensor having one or more spatial axes and a channel axis with first input channels from a memory;

generating a first vector from the input tensor by applying a first filter layer of a convolution model, the first vector having first output channels, a number of the first output channels is less than a number of the first input channels;

convolving each of the first output channels with a respective shared spatial filter of shared spatial filters of a second filter layer of the convolution model to generate an output tensor from the first vector by multiplying, via first multiplier circuitries of a digital processing engine, first data of a first output channel of the first output channels with first weights, and multiplying, via second multiplier circuitries of the digital processing engine, second data of a second output channel of the first output channels with the first weights; and generating output data from the output tensor and storing the output data in the memory.

18. The method of claim 17 further comprises:

applying a third filter layer of the convolution model to generate third intermediate data from the output tensor, the third intermediate data having a number of second output channels smaller than the number of the first input channels.

19. The method of claim 18 further comprises:

applying a fourth filter layer of the convolution model to generate the output data from the third intermediate data, the output data having a number of third output channels equal to the number of the first input channels.

20. The method of claim 17, wherein the first multiplier circuitries and the second multiplier circuitries are comprised by first multipliers are arranged in first rows and first columns, and wherein applying the second filter layer comprises summing, with first summation circuitries, an output from each multiplier circuitry of a first column of the first columns.

21. The method of claim 20 further comprising applying a third filter layer, wherein applying the third filter layer comprises:

multiplying, with second multipliers, an output of each of the first summation circuitries with second weights, wherein the second multipliers are arranged in second rows and second columns; and summing, with second summation circuitries, an output from each of the second multipliers of a common row of the second rows.

* * * * *